Patented Dec. 11, 1928.

1,694,794

UNITED STATES PATENT OFFICE.

JOHN BURNS READ AND MELVILLE F. COOLBAUGH, OF GOLDEN, COLORADO.

METHOD OF ROASTING SULPHIDE MINERALS.

No Drawing.    Application filed May 25, 1926.  Serial No. 111,652.

In roasting ores or concentrates preliminary to leaching, especially leaching with sulphuric acid followed by electrolysis, it is very desirable to produce a regulated quantity of soluble sulphates, which will be converted to sulphuric acid upon electrolysis and will just make up for the sulphuric acid lost during the leaching step. It is also desirable that a minimum quantity of ferrites, which are compounds of metallic oxides with ferric oxide, be produced in the roast, since these compounds are not soluble in dilute acids and, as a result, prevent the recovery of valuable metals.

The object of this invention is to provide a rapid and efficient method for roasting sulphide minerals, whereby a regulated amount of sulphates may be formed, and also a minimum amount of ferrites will be produced when iron minerals are present. The process is applicable to any kind of sulphide minerals. These may be simple sulphides or mixtures known as complex sulphides. The invention is especially applicable to sulphides of copper, or zinc, or mixtures of other sulphides with copper or zinc sulphides.

Our result is accomplished by roasting the sulphide minerals in the presence of oxygen or air, and at the same time causing the minerals and gases to travel in the same direction, thereby forming an excessive quantity of sulphates, and then, toward the end of the roast, charging more of the sulphide mineral which will react with the sulphates already formed whereby any portion of them may be decomposed to produce oxides and sulphur dioxide.

At the present time, the method employed in roasting sulphide minerals to form a regulated amount of sulphates and a minimum amount of ferrites is that of using a countercurrent movement of minerals and gases and very carefully regulated temperatures. If the temperatures are too high, excessive quantities of ferrites form, and there will be a deficiency of sulphate. If the temperatures are too low, greater quantities of sulphates form than are desired. There is no easy means of regulating both of these factors. Ferrites which are once formed are not decomposed, and sulphates once formed can be decomposed readily only by means of heat which has a tendency to form excessive ferrites.

To understand this process more fully, the method of roasting and the chemical reactions will be described in detail: Any suitable type of roasting furnace may be used for this process, but the one preferred is of the super-imposed hearth type. The ore to be roasted is charged into the top of this roaster together with the air for oxidation. For ignition purposes, it may be advisable to charge some of the air on the second or third hearth from the top and allow a portion of this to travel upward to heat and ignite the incoming ore, as described in our patent application, Serial Number 46,734. After it becomes ignited, the ore travels downward in the presence of sulphur dioxide and sulphur trioxide gases, thereby forming an excessive quantity of sulphates. If any ferrites form in the upper part of the furnace, they will be decomposed by sulphur dioxide and sulphur trioxide and form sulphates, as described in our Patent No. 1,582,347, April 27, 1926. After the major portion of the sulphide sulphur has been decomposed and the maximum or a large quantity of sulphates formed, more of the original sulphide mineral, or any other sulphide mineral, if preferred, is charged upon one of the lower hearths of the furnace. In this way sulphates are decomposed forming oxides and sulphur dioxide, and sulphides are likewise decomposed forming oxides and sulphur dioxide. Taking zinc minerals as an example, the chemical reaction will be as follows:

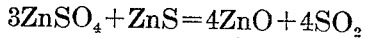

$$3ZnSO_4 + ZnS = 4ZnO + 4SO_2$$

The above reaction absorbs heat, while the reaction between zinc sulphide and oxygen or air gives off heat. By the addition of regulated quantities of sulphide minerals, it is possible to control temperatures easily and completely. There is little or no danger of the formation of ferrites during this step since the temperature of the particles will not be excessive and since the atmosphere in this part of the furnace will contain an excessive quantity of sulphur gases. The temperature at which zinc sulphate and zinc sulphide begin to interact is approximately 550° C. The reaction becomes vigorous at 575° to 650° C. At none of these temperatures will ferrites form in any appreciable quantities in the presence of an excessive quantity of sulphur gases.

The temperatures in the upper part of the furnace will range from 450° C., to a maximum of 700° C. In the lower part of the furnace the temperature should be maintained from 550° to 700° C.

As an example, this process can be applied to an ore containing 25 to 50 per cent of zinc as sulphide, 2 to 20 per cent of iron as FeS or $FeS_2$, and varying quantities of copper sulphides and lead sulphides and insoluble material. By the roast as described, appreciable quantities of zinc sulphate and some zinc oxide would be formed in the upper part of the furnace. As the ore descends, more sulphates form and zinc ferrites decompose. When more of the original sulphide or any other sulphide is added in the lower part of the furnace, a regulated quantity of the zinc sulphate can be decomposed by regulating the amount of such sulphide added. This will assure the presence of a regulated quantity of zinc sulphate, and it will also insure the minimum quantity of ferrites in the discharge.

The above regulation insures much better extraction of the metallic values.

We claim:—

1. The process comprising subjecting sulphide minerals to an oxidizing roast while causing the minerals and gases to travel in the same direction through the furnace, thereby forming sulphates and then toward the end of the roast, charging a predetermined amount of sulphide mineral to react with sulphates already formed, whereby any portion of the said sulphates may be decomposed to produce oxides and retain regulated amounts of sulphates.

2. The process comprising subjecting sulphide minerals to an oxidizing roast, while causing the minerals and gases to travel in the same direction through the furnace, thereby forming sulphates and then toward the end of the roast, charging a predetermined quantity of sulphide mineral to react with sulphates already formed to regulate the temperature of the reaction.

3. The process comprising subjecting minerals containing zinc sulphide to an oxidizing roast, while causing the minerals and gases to travel in the same direction through the furnace, thereby forming sulphates and then toward the end of the roast, charging a predetermined quantity of sulphide mineral to react with sulphates already formed to regulate the temperature of the reaction between substantially 550 and 700 degrees C., whereby any portion of the said sulphates may be decomposed to produce oxides and retain a regulated amount of sulphates.

4. The process comprising subjecting minerals, containing sulphides of iron and one or more of the sulphides of zinc, copper and lead, to an oxidizing roast, while causing the minerals and gases to travel in the same direction through the furnace, thereby forming sulphates and then toward the end of the roast, charging a predetermined quantity of sulphide mineral to react with sulphates already formed, whereby any portion of the sulphates may be decomposed to produce oxides and sulphur dioxide and whereby the temperature of the reaction may be controlled to produce a minimum quantity of ferrites.

5. The process comprising subjecting minerals, containing sulphides of zinc and iron, to an oxidizing roast, while causing the minerals and gases to travel in the same direction through the furnace, thereby forming sulphates and then toward the end of the roast, charging a predetermined quantity of sulphide mineral to react with sulphates already formed, whereby any portion of said sulphates may be decomposed to produce oxides and sulphur dioxide, and to regulate the temperature of the reaction between substantially 550 and 700 degrees C., whereby a minimum quantity of ferrites will be formed.

6. In a sulphatizing roast, the step of adding a regulated quantity of sulphide material to react with already formed sulphates, whereby any portion of the said sulphates may be decomposed.

7. In a sulphatizing roast, the step of adding a regulated quantity of sulphide mineral to react with already formed sulphates, to regulate the temperature of the reaction.

In testimony whereof we affix our signatures.

JOHN BURNS READ.
MELVILLE F. COOLBAUGH.